(12) United States Patent
McCoy

(10) Patent No.: US 8,573,502 B2
(45) Date of Patent: Nov. 5, 2013

(54) MODULAR VISUAL AND ELECTRONIC IDENTIFICATION TAG

(75) Inventor: William E. McCoy, Temple, TX (US)

(73) Assignee: Temple Tag LLC, Temple, TX (US)

( * ) Notice: Subject to any disclaimer, the term of this patent is extended or adjusted under 35 U.S.C. 154(b) by 0 days.

(21) Appl. No.: 13/293,510

(22) Filed: Nov. 10, 2011

(65) Prior Publication Data

US 2013/0119142 A1    May 16, 2013

(51) Int. Cl.
*G06K 19/06* (2006.01)
(52) U.S. Cl.
USPC .......................................................... 235/492
(58) Field of Classification Search
USPC ........................................... 40/301; 235/492
See application file for complete search history.

(56) References Cited

U.S. PATENT DOCUMENTS

| | | | |
|---|---|---|---|
| 7,107,936 B2 * | 9/2006 | Fantin et al. | 119/655 |
| 7,591,091 B2 * | 9/2009 | Connole | 40/301 |
| 2010/0058629 A1 * | 3/2010 | Albee et al. | 40/301 |
| 2011/0088295 A1 * | 4/2011 | Ibsen et al. | 40/301 |
| 2012/0285056 A1 * | 11/2012 | Corrales, Jr. | 40/301 |

FOREIGN PATENT DOCUMENTS

EP    2191715 A1 *   6/2010 ..................... 40/301

* cited by examiner

*Primary Examiner* — Daniel Hess
*Assistant Examiner* — Steven J Malone
(74) *Attorney, Agent, or Firm* — Katarzyna Brozynski; David G. Henry

(57) ABSTRACT

A modular animal ear tag with both visual identification and RFID identification components, with the visual and RFID identification components being easily mated and subsequently separated to facilitate re-use of either or both such components.

8 Claims, 2 Drawing Sheets

US 8,573,502 B2

MODULAR VISUAL AND ELECTRONIC IDENTIFICATION TAG

BACKGROUND OF THE INVENTION

1. Field of the Invention

Applicant's invention relates identification tags, and particularly to both visual and electronically readable identification tags used to identify and manage livestock.

2. Background Information

The United States Beef Industry annually markets tens of millions of animals to supply both domestic and foreign demand for safe, high quality beef. These animals are fed in thousands of confinement feeding operations ("feed lots") scattered across the country. While many of these operations are small (less than 4000 head) a vast majority (over 75%) of cattle sold pass through these commercial operations.

These larger facilities are characterized by multiple owners of the cattle throughout the feed lot(s), which mixture creates a need for identification of cattle, or groups of cattle, in a quick and easily distinguished manner. First the plastic (visual) ear-tag industry arose to meet such needs, and this was followed by electronically readable tags as computer, database management and integration, and RFID technologies developed and became accessible, reliable and cost effective to the point for allowing for the rapid, automated reading of uniquely identifiable tags as are associated with specific animals.

Historically, groups of animals had been rather simply distinguished either by color-coding with ear-tags or more commonly using pen or lot numbers printed on visual ear-tags.

Safety initiatives relating, in part, to a need for rapid location and quarantining of suspected diseased cattle, as well as generally more focused management within the Beef Industry have led to the practice of individually identifying animals, even within ownership groupings. Whether through use of visual or RFID tags, each animal transported in commerce is typically, uniquely identified by its tag—a tag that cannot, by law and regulation, be re-used. The need for individual animal identification also bolstered the use of RFID tags as alleviating the labor-intensive and potentially error-prone practice of visually identifying each and every uniquely labeled animal.

To prevent mistaken identification, thwarting of safety measures that require specific animal identification, and even fraud, RFID tags are strictly single-use when used for transporting animals in commerce.

Feed lot operations, however, do not require strict, single-use of tags, as identification and tracking of animals in that context is usually, merely local management issue. In the feed lot context, visual tags are adequate (and preferred) for many purposes, but RFID tags (if somehow made cost-effective) might also provide similar labor-savings, and accuracy enhancing benefits.

At present, the would-be highly beneficial use of both visual and RFID tags in feed lot operations is disincentivized, if not cost-prohibitive in some cases, in part, because there is no present, practical avenue for re-using RFID tags, especially in conjunction with using visual tags.

Being able to conveniently and cost-effectively use both visual ear tags and RFID tags in a feed lot context is a highly desirable objective for the livestock industry.

SUMMARY OF THE INVENTION

A present objective of providing at least some embodiments of the present invention is to facilitate the use of both visual and RFID tags in contexts in which unique identification of animals is desired, but re-use of RFID tags is not prohibited.

Another objective of providing some embodiments of the present invention is to facilitate the simultaneous application to an animal of both visual and RFID tags.

Another objective of providing some embodiments of the present invention is to facilitate the re-use RFID tags that have been removed from previous animals.

Another objective of providing some embodiments of the present invention is to facilitate the easy and non-destructive separation of visual and RFID tags removed from an animal, in cases when either or both such tags are desired to be used on another animal.

In satisfaction of these and related objectives, certain embodiments of Applicant's present invention provide a modular animal ear tag with both visual identification and RFID identification means. In preferred embodiments, the visual and RFID identification means are easily mated and subsequently separated to facilitate re-use of either or both such components. In addition, use of the combined visual and RFID tag afforded by the present invention is more humane, as it involves, rather than multiple punctures for each type of tag, a single operation that is identical to placement of an RFID tag alone.

Despite the advantages afforded by embodiments of the present invention, there is no known device or construction which includes both visual and RFID identification means, and permits non-destructive separation and re-use of such components.

BRIEF DESCRIPTION OF THE DRAWINGS

The accompanying drawings, which are included to provide further understanding of the invention and are incorporated in and constitute a part of this specification, illustrate preferred embodiments of the invention and, together with the detail description, serve to explain the principals of the invention.

DETAILED DESCRIPTION OF THE PREFERRED EMBODIMENT

Figure 1:
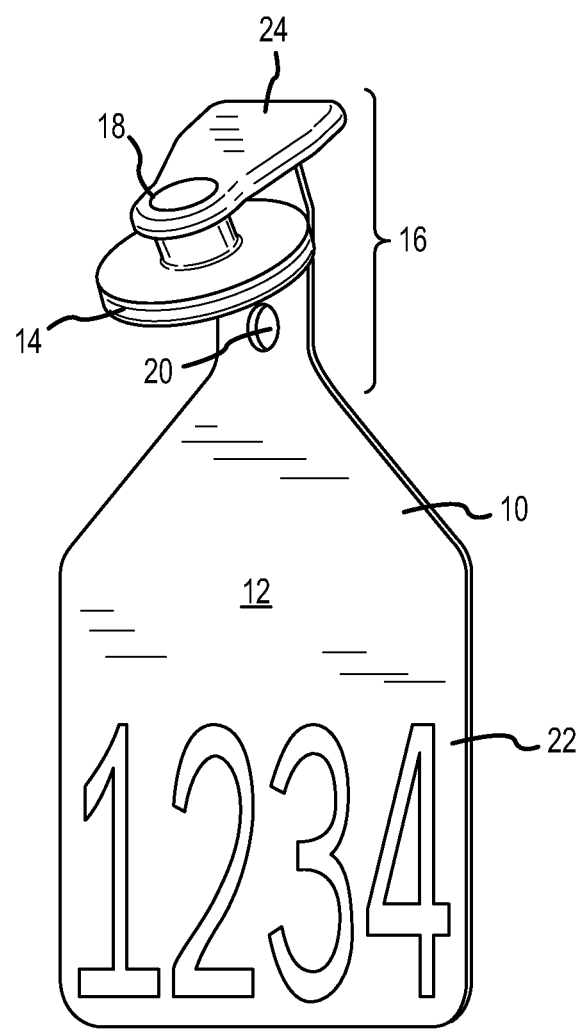
FIG. 1 is a front elevational view of a modular visual and RFID tag assemblage showing one of the preferred embodiments of the present invention.
Figure 2:
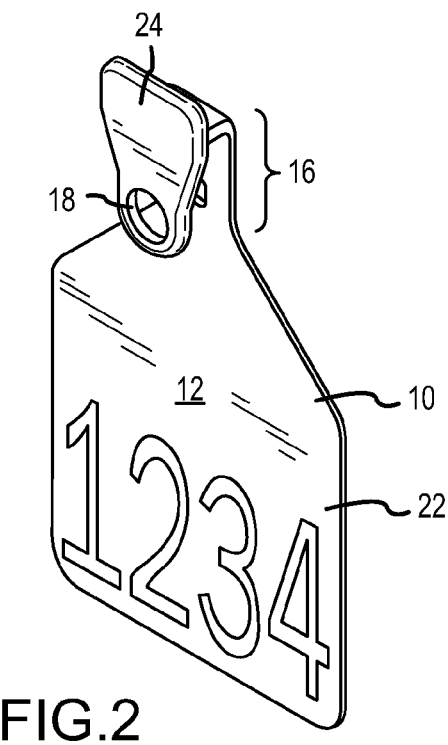
FIG. 2 is a perspective view of the present invention according to the form of embodiment of FIG. 1.
Figure 3:
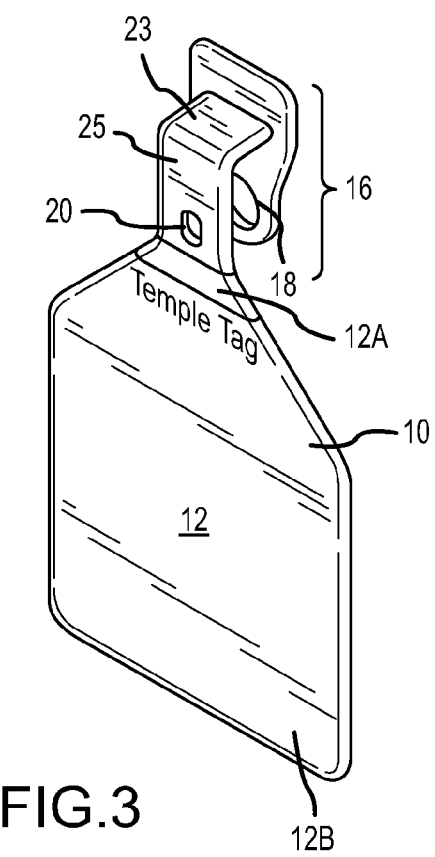
FIG. 3 is another perspective view of the present invention according to the form of embodiment of FIG. 1.

The assemblage of one preferred embodiment of the present invention is depicted in the accompanying FIGS. 1-3. At its most basic level, such an embodiment will include a visual ear tag that includes facilities for reversible mating between the visual ear tag and an RFID tag. The combined assemblage is easily attached to, and subsequently removed from an animal through use of conventional ear tag attachment tools that are well known in the art.

Referring again to FIGS. 1-3, the modular animal ear tag of the present invention is identified generally by the reference number 10. Tag 10 includes a visual ear tag panel 12, with a top end 12A and a bottom end 12B, on which will typically be imprinted indicia 22 that reflects a unique identifier that is assigned to the particular recipient animal and maintained in an operators records.

An extension 16 from one end of panel 12 includes holes 18 and 20 formed there through. Extension 16 also has a front plate 24 and a back plate 25 connected by a linking member 23. As shown in FIG. 1, hole 18 is sized and shaped to snuggly receive, yet reversibly maintain the other portion of a RFID tag 14 that defines the orifice that receives a pin (not shown in the drawings) that will, in most cases, have passed through an animal's ear and into the RFID tag to secure the tag to the animal. The RFID tag 14 will, according to conventional practice, have been programmed to likewise be readable as to a unique identifier that corresponds to the recipient animal.

Hole 20 of extension 16 is designed to allow passage of the referenced RFID attachment pin through extension 16 before passing into RPID tag 14, whereby both panel 12 and RPID tag 14 are secured, as a unit 10, to a recipient animal. The presence of panel 12, when assemblage 10 is constructed as here taught, in no way interferes with attachment of the RPID tag through use of well-known ear tag attachment tools and steps (see, for example, an animal ear tag attachment tool shown in U.S. Pat. Nos. 3,812,859 and 4,497,321—here incorporated by reference—that are generally typical in overall design of such tools as urge a securing pin through an animal's ear and into a receiving structure in a tag for securing a tag assembly to the animal).

Once the assemblage 10 is complete, no additional steps whatsoever are required to attach both visual and RPID tags using the assemblage 10, when compared with only attaching the same RPM tag (or a visual tag) as is conventionally done in the industry. Furthermore, as referenced previously, use of the present visual and RFD) tag assemblage 10 is more humane than would otherwise be possible when using multiple tag types, because it involves (rather than multiple punctures—one for each tag type) a single attachment to a recipient animal's ear.

Once the use for a particular tag assemblage 10 passes with respect to a specific animal, assemblage 10 may be removed from the animal, panel 12 and RFID tag 14 easily separated. Afterwards, either or both of the visual tag (panel 12) and RPID tag 14 may be re-used with another animal, with or without RPID tag being re-programmed with new identification information.

Assemblage 10 of the present invention now, for the first time, facilitates the practical, convenient and cost-effective, simultaneous use (and re-use) of both visual and RFID tags in contexts where such is permissible by law and regulations, and desirable from a convenience and cost-savings perspective.

Alternative embodiments of the present invention may involve other than the snug-fit engagement between a portion of an RFID "tag" and a visual panel as described. Any snap-fit, hook and loop, or other mechanical linkage between the visual and electronic identification components of the modular tag assemblage in this context will suffice, if sufficiently secure for practical use and application using conventional tag applicators in a single operation, and involving a single attachment point to a recipient animal as described.

It should also be understood that the "animal attachment means" referenced in the claims are configured to allow for simultaneous attachment of the visual and RFID tags to a recipient animal when the two components are mated. They need not actually be mated at the time of attachments to an animal to fall within the scope of the claims. In theory, if not in practicality, one could (depending on the particular embodiment involved) attach one or the other of the visual and RFID tags to the recipient animal, and later mate the previously un-linked component to the attached one to achieve the contemplated assemblage. In such an event, the components still will have been configured to permit (or be "configured for") the simultaneous linkage (attachment directly, or through an intervening component) with the recipient animal, when the components are, in fact, mated.

Although the invention has been described with reference to certain specific characteristics or features of preferred embodiments, this description is not meant to be construed in a limited sense. In particular, the reference to use of embodiments of the present invention in the livestock industry in no way is intended to preclude use of like similar assemblages that fall within the scope of the claims in other industries or applications in which visual and RFID identification would be desirable.

Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An identification device for simultaneous visual and electronic monitoring of a recipient animal comprising:
   an RFID identification unit having an outer portion that defines an orifice, said orifice extending through the thickness of said RFID identification unit; and
   a visual identification unit having a visual identification panel and an extension member, said visual identification panel having a top end and a bottom end, said extension member being attached to said top end such that said visual identification unit is a single assemblage, said extension member having a front plate and a back plate, said front plate oriented substantially parallel to said back plate, said front plate and said back plate being connected by a linking member, said linking member being substantially perpendicular to said front and said back plate, said front plate having a front plate opening and said back plate having a back plate opening, said openings extending through the thickness of said extension member, said front plate opening further configured for snuggly receiving and reversibly maintaining a portion of said RFID identification unit in mechanical engagement with said front plate, said back plate opening further configured for snuggly receiving and reversibly maintaining a securing means in mechanical engagement with said back plate, said securing means inserted through said orifice of said RFID identification unit.

2. The device of claim 1 wherein said securing means is a pin configured for securing an animal ear tag to a recipient animal.

3. The device of claim 1 wherein said visual identification panel is a means for displaying visual identification information such as alpha-numeric characters.

4. The device of claim 1 wherein said securing means is used to attach said identification device to an animal's ear at a single attachment site.

5. The device of claim 1 wherein said securing means is designed to be removed from said recipient animal's ear enabling said assemblage to be re-used by attaching to a new animal's ear.

6. An identification device for simultaneous visual and electronic monitoring of a recipient animal comprising:
   an RFID identification unit having an outer portion that defines an orifice, said orifice extending through the thickness of said RFID identification unit, said orifice having a diameter sufficient to allow a securing means to snuggly fit within said orifice; and
   a visual identification unit having a visual identification panel and an extension member, said visual identification panel having a top end and a bottom end, said extension member being attached to said top end such that said visual identification unit is a single assemblage, said extension member having a front plate and a back plate, said front plate oriented substantially parallel to said back plate, said front plate and said back plate being connected by a linking member, said linking member being substantially perpendicular to said front and said back plate, said front plate having a front plate opening and said back plate having a back plate opening, said openings extending through the thickness of said extension member, said front plate opening further configured for snuggly receiving and reversibly maintaining a portion of said RFID identification unit in mechanical engagement with said front plate, said back plate opening further configured for snuggly receiving and reversibly maintaining said securing means in mechanical engagement with said back plate, said securing means having a diameter and a length, said diameter configured to snuggly fit within said RFID identification unit orifice, said length configured to extend entirely through said RFID identification unit, said front plate, said recipient animal's ear, and said back plate.

7. A method for simultaneous visual and electronic monitoring of animals using an identification device comprising the steps of:

selecting an RFID identification unit, said RFID identification unit having an outer portion that defines an orifice, said orifice extending through the thickness of said RFID identification unit, said orifice having a diameter sufficient to allow a securing means to snuggly fit within said orifice;

selecting a visual identification unit, said visual identification unit having a visual identification panel and an extension member, said visual identification panel having a top end and a bottom end, said extension member being attached to said top end such that said visual identification unit is a single assemblage, said extension member having a front plate and a back plate, said front plate oriented substantially parallel to said back plate, said front plate and said back plate being connected by a linking member, said linking member being substantially perpendicular to said front and said back plate, said front plate having a front plate opening and said back plate having a back plate opening, said openings extending through the thickness of said extension member, said front plate opening further configured for snuggly receiving and reversibly maintaining a portion of said RFID identification unit in mechanical engagement with said front plate, said back plate opening further configured for snuggly receiving and reversibly maintaining a securing means in mechanical engagement with said back plate;

selecting said securing means, said securing means having a diameter configured to snuggly fit in said orifice of RFID identification unit, said securing means also having a length configured to extend entirely through said RFID identification unit, said front plate, and said back plate;

placing said identification device on a recipient animal's ear such that said animal's ear is directly attaching to said back plate; and attaching said identification device to said recipient animal's ear by inserting said securing means through said orifice of RFID identification unit, said front plate, said animal's ear, and said back plate such that only one attachment point is created, to enable simultaneous visual and electronic monitoring of said recipient animal.

8. The method of claim 7 further comprising:

removing the identification device from the recipient animal's ear; and recovering each component of the device for reuse.

\* \* \* \* \*